(12) United States Patent
Nannichi

(10) Patent No.: US 11,216,849 B2
(45) Date of Patent: Jan. 4, 2022

(54) POINT OF SALE SYSTEM CONFIGURED TO DETERMINE A DEGREE OF CUSTOMER INTEREST WITH RESPECT TO PROMOTIONAL CONTENT

(71) Applicant: TOSHIBA TEC KABUSHIKI KAISHA, Tokyo (JP)

(72) Inventor: Toshihiko Nannichi, Fuchu Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/896,128

(22) Filed: Jun. 8, 2020

(65) Prior Publication Data
US 2021/0027337 A1 Jan. 28, 2021

(30) Foreign Application Priority Data
Jul. 22, 2019 (JP) .............................. JP2019-134626

(51) Int. Cl.
| | | |
|---|---|---|
| *G06Q 30/02* | (2012.01) | |
| *G06F 3/01* | (2006.01) | |
| *G06F 16/9535* | (2019.01) | |
| *G06F 16/535* | (2019.01) | |
| *G06K 9/00* | (2006.01) | |

(52) U.S. Cl.
CPC ......... *G06Q 30/0269* (2013.01); *G06F 3/013* (2013.01); *G06F 16/535* (2019.01); *G06F 16/9535* (2019.01); *G06K 9/00302* (2013.01); *G06Q 30/0242* (2013.01); *G06Q 30/0268* (2013.01); *G06Q 30/0272* (2013.01)

(58) Field of Classification Search
CPC ........... G06Q 30/0269; G06Q 30/0242; G06Q 30/0268; G06Q 30/0272; G06F 16/535; G06F 16/9535
See application file for complete search history.

(56) References Cited

U.S. PATENT DOCUMENTS

| | | | | |
|---|---|---|---|---|
| 2003/0123728 | A1* | 7/2003 | Dimitrova | H04N 7/181 382/173 |
| 2016/0117740 | A1* | 4/2016 | Linden | G06Q 50/01 705/14.66 |
| 2016/0275634 | A1* | 9/2016 | Singh | H04L 51/14 |
| 2017/0255862 | A1* | 9/2017 | Li | H04L 67/10 |
| 2018/0220014 | A1* | 8/2018 | Hayakawa | H04N 1/00251 |
| 2018/0341974 | A1* | 11/2018 | Pan | G06Q 30/0255 |
| 2019/0265802 | A1* | 8/2019 | Parshionikar | G06F 3/012 |

FOREIGN PATENT DOCUMENTS

| | | | | |
|---|---|---|---|---|
| JP | 2010-140287 A | 6/2010 | | |
| WO | WO-2017115453 A1 * | 7/2017 | ............. | G06T 11/00 |

* cited by examiner

*Primary Examiner* — Scott C Anderson
(74) *Attorney, Agent, or Firm* — Kim & Stewart LLP

(57) ABSTRACT

An information processing system includes an imaging device, a display, a memory, and a processor configured to acquire a customer ID for identifying a customer, generate a screen for the display for showing promotional content, control the imaging device to capture an image of the customer's face, then analyze the captured image to determine the degree of the customer's interest in the displayed content. The displayed promotional content is then stored in the memory in in association with the customer ID and the determined degree of the customer's interest.

19 Claims, 10 Drawing Sheets

FIG. 6

| CONTENT SECTION 54241 | PURCHASE COMMODITY SECTION 54242 | SCORE SECTION 54243 | CATEGORY STORAGE SECTION 54244 |
|---|---|---|---|

| CATEGORY CODE SECTION 5431 | COMMODITY CODE SECTION 5432 | CONTENT SECTION 5433 |
|---|---|---|
| CATEGORY 1 | COMMODITY 1A | CONTENT 1A |
|  | COMMODITY 1B | CONTENT 1B |
|  | COMMODITY 1C | CONTENT 1C |
| CATEGORY 2 | COMMODITY 2A | CONTENT 2A |
|  | COMMODITY 2B | CONTENT 2B |
|  | COMMODITY 2C | CONTENT 2C |
| CATEGORY 3 | COMMODITY 3A | CONTENT 3A |
|  | COMMODITY 3B | CONTENT 3B |
|  | COMMODITY 3C | CONTENT 3C |

POINT OF SALE SYSTEM CONFIGURED TO DETERMINE A DEGREE OF CUSTOMER INTEREST WITH RESPECT TO PROMOTIONAL CONTENT

CROSS-REFERENCE TO RELATED APPLICATION

This application is based upon and claims the benefit of priority from Japanese Patent Application No. 2019-134626, filed on Jul. 22, 2019, the entire contents of which are incorporated herein by reference.

FIELD

Embodiments described herein relate generally to an information processing system and an information processing method.

BACKGROUND

In the related art, there is a POS terminal or a checkout device that has a customer display unit for providing customers with information about a commodity being purchased in a store. According to this art, the store can promote a commodity or the like to the customers via advertisements presented on the customer display unit or the like.

However, even if the store desires to promote a commodity to its customers, if the customers have no interest in the product being advertised, such a promotion may annoy or bother the customers.

DESCRIPTION OF THE DRAWINGS

FIG. 6 is a diagram illustrating subsections included in a content information section.

FIG. 7 is a diagram illustrating a structure of data stored in a category information area.

DETAILED DESCRIPTION

One or more embodiments provide an information processing system and an information processing method capable of displaying a promotional content that a customer is more likely to have an interest.

According to one embodiment, an information processing system includes an imaging device, a display, a memory, and a processor. The processor is configured to acquire a customer ID for identifying a customer, generate a screen for the display including a promotional content, control the imaging device to capture an image of the customer's face, analyze the captured image of the customer's face and determine a degree of the customer's interest with respect to the displayed promotional content according to the analysis of the captured image, and store the displayed promotional content in the memory in association with the customer ID and the determined degree of customer interest.

Hereinafter, example embodiments are described with reference to the drawings. In these non-limiting, example embodiments, a commodity registration device and a checkout device in a semi-self-service POS (Point of Sales) system are described as examples of an information processing device.

Figure 1:
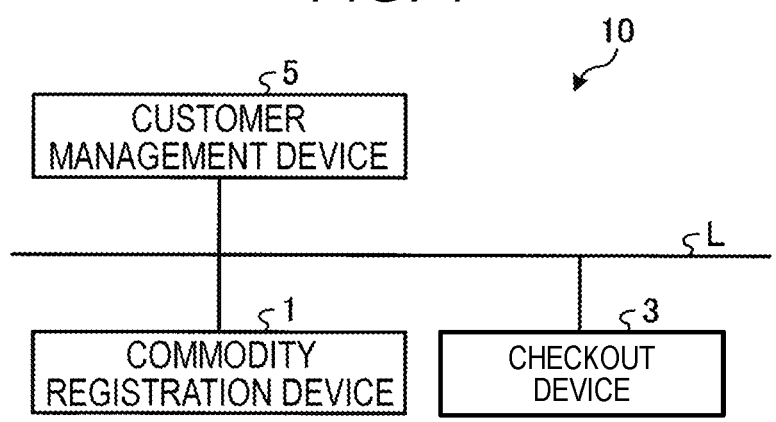
FIG. 1 is a diagram illustrating an information processing system according to an embodiment.

FIG. 1 is a diagram illustrating an information processing system 10 according to an embodiment. As illustrated in FIG. 1, the information processing system 10 include a commodity registration device 1, a checkout device 3, and a customer management device 5. The commodity registration device 1, the checkout device 3, and the customer management device 5 are connected to each other via a communication line L such as the local area network (LAN) and can communicate with each other. A combination of the commodity registration device 1 and one or more checkout devices 3 connected to the commodity registration device 1 is called a semi-self-service POS system. For the purpose of illustration, FIG. 1 shows a semi-self-service POS system in which one checkout device 3 is connected to one commodity registration device 1.

A clerk performs a sales registration operation for a commodity sold in a store using the commodity registration device 1. The commodity registration device 1 performs sales registration processing according to the sales registration operation(s) performed by the clerk. The commodity registration device 1 transmits commodity information (e.g., the name and price) of the commodity subjected to the sales registration processing to the checkout device 3. The customer can perform a checkout operation (that is, transaction settlement including payment processing or the like) using the checkout device 3. The checkout device 3 can perform checkout processing based on the commodity information received from the commodity registration device 1 according to the checkout operation(s) performed by the customer.

Here, a "sales registration processing" refers to processing in which the commodity registration device 1 reads a symbol attached to a commodity, reads out commodity information (e.g., the name and price) of the commodity from a commodity master database using the commodity code obtained from the symbol, displays the read commodity information for the corresponding commodity, and then stores the commodity information in a commodity information area in a memory unit or the like. The checkout processing refers to processing of: displaying a total amount and a tax amount relating to the transaction based on all the commodity information received from the commodity registration device 1, calculating and displaying the change due to the customer based on the payment amount, dispensing a receipt showing commodity information and/or checkout information (e.g., the total amount due, the payment amount received, the change amount returned, and the like). Information including both the commodity information and the checkout information is referred to as sales information or transaction information.

Figure 2:
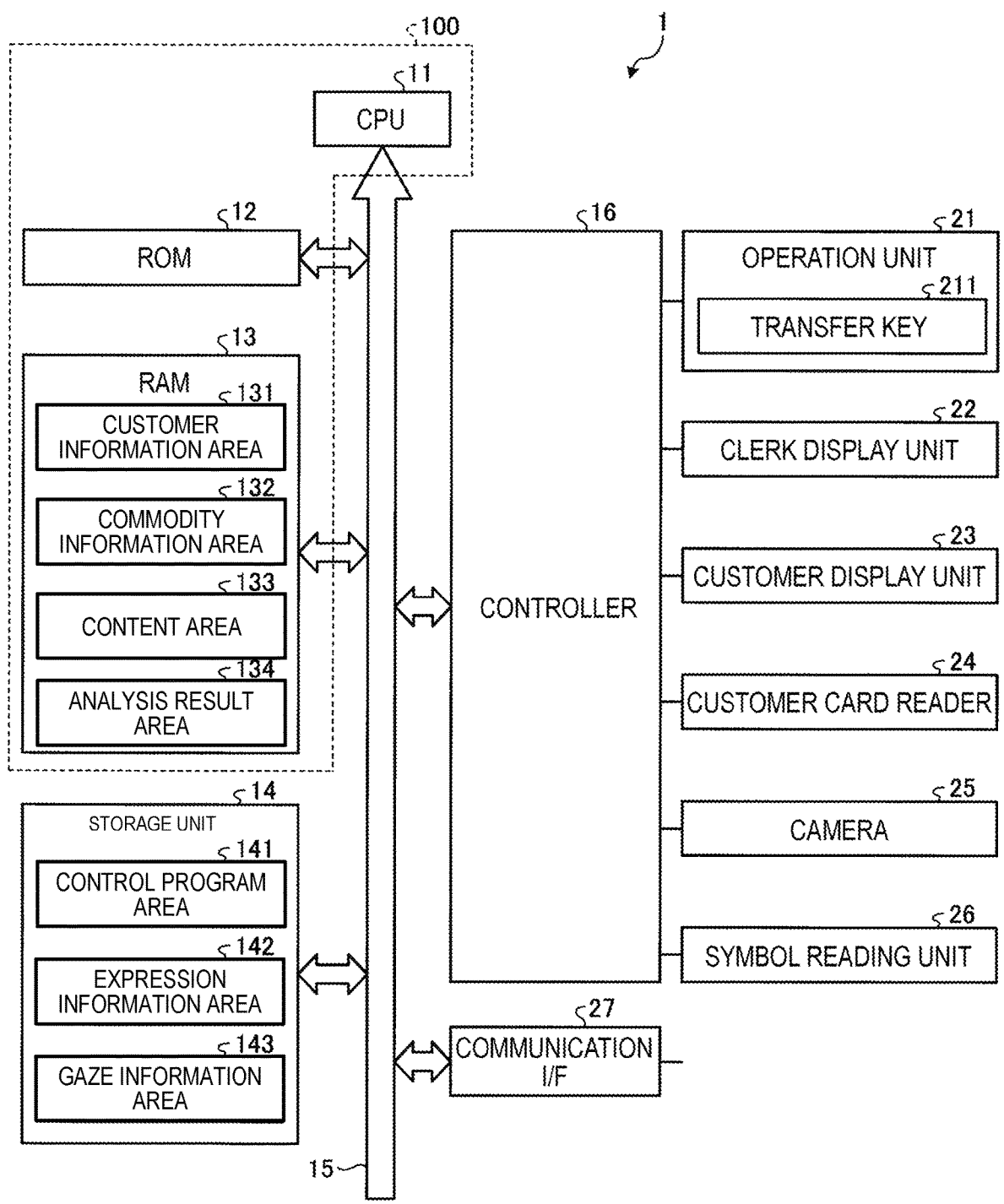
FIG. 2 is a hardware block diagram of a commodity registration device.

FIG. 2 is a hardware block diagram of the commodity registration device 1. The commodity registration device 1 includes a customer display unit 23 and a camera 25.

The commodity registration device 1 displays a promotional content, such as an advertisement for a commodity, on the customer display unit 23 for the customer. The content is, for example, an image (still picture) or a motion picture (video or animations) related to a commodity that has been purchased by the customer or otherwise another commodity for which the store desires to promotes sales, or the like. The content may be, for example, an image or a motion picture relating to a special offer promotion available at the store, in addition to just one commodity.

The camera 25 is provided, for example, at the periphery of the customer display unit 23 of the commodity registration device 1. The camera 25 captures an image of the face of the customer when looking at the screen of the customer display unit 23.

The commodity registration device 1 analyzes the expression of the customer while looking at the content displayed on the customer display unit 23 based on the customer's face image which has been captured by the camera 25. In the expression analysis, a smile degree can be determined based on the customer's face expression which has been captured by the camera 25. In this context, the "smile degree" refers to how much the customer is smiling in the captured image. When the smile degree is high, the commodity registration device 1 determines that the customer is interested in the content. When the smile degree is low, the commodity registration device 1 determines that the customer is less interested in the content.

Specifically, a facial expression (such as laughing, joy, smile, sadness, surprise, anger, scorn, fear, and expressionlessness) of the customer is used to determine the customer's smile degree. To recognize such a facial expression of the customer, a well-known face detection technology (for example, as discussed in the related art reference, "Technologies Leading to the Next-generation Digital Cameras and Movies (5); Release the Shutter at the Best Moment!: Face Detection, Face Recognition and Facial Expression Recognition Technology," Takayoshi Yamashita, et al., *The Journal of the Institute of Image Information and Television Engineers*, Vol. 62, No. 5, pp. 708 to 713 (2008) can be used for detecting the eyes and the mouth of the customer, and calculating feature data relating to the eyes and the mouth. Specifically, in a storage unit 14 of the commodity registration device 1 (with reference to FIG. 2), in association with each of possible facial expressions, such as laughing, joy, smile, sadness, surprise, anger, scorn, fear, and expressionlessness, information concerning a typical shapes of eyes and mouth and/or shadows that appear on the face is stored. Then, based on the information stored in the storage unit 14, the commodity registration device 1 determines which expression corresponds to, or is closest to, the eyes and the mouth shown in the captured image. That is, the commodity registration device 1 determines the customer's smile degree (or the deemed degree of interest) based on the determined face expression. For example, the commodity registration device 1 determines the smile degree as "5" when it is determined that the customer laughs, "3" when it is determined that the customer is joyful, and "1" when it is determined that the customer smiles. As such, the smile degree is scored according to how much the customer smiles. When it is determined that the customer is expressionless, the smile degree is scored to 0. In contrast, when it is determined that the customer appears the expression of sadness, anger, scorn, or the like, a negative score is given to the smile degree.

That is, based on the face expression of the customer looking at the content display on the customer display unit 23, the commodity registration device 1 gives a positive score when the customer is interested in the content and gives a negative score when the customer is not interested in the content to score the customer's reaction to the content.

The commodity registration device 1 analyzes the customer's expression by using a well-known gaze detection technology. A specific method of analyzing the customer's expression can be used to determine a gaze degree (a degree value based on whether gazing time is long or short) indicating how long period of time the customer has been gazing the content displayed on the customer display unit 23. When the customer has been looking at the content for a long period of time, it can be determined that the customer is interested in the content, and thus a positive score is given as the gaze degree. When the customer has not been looking at the content and looked away, a negative point is given as the gaze degree due to low interest.

Figure 3:
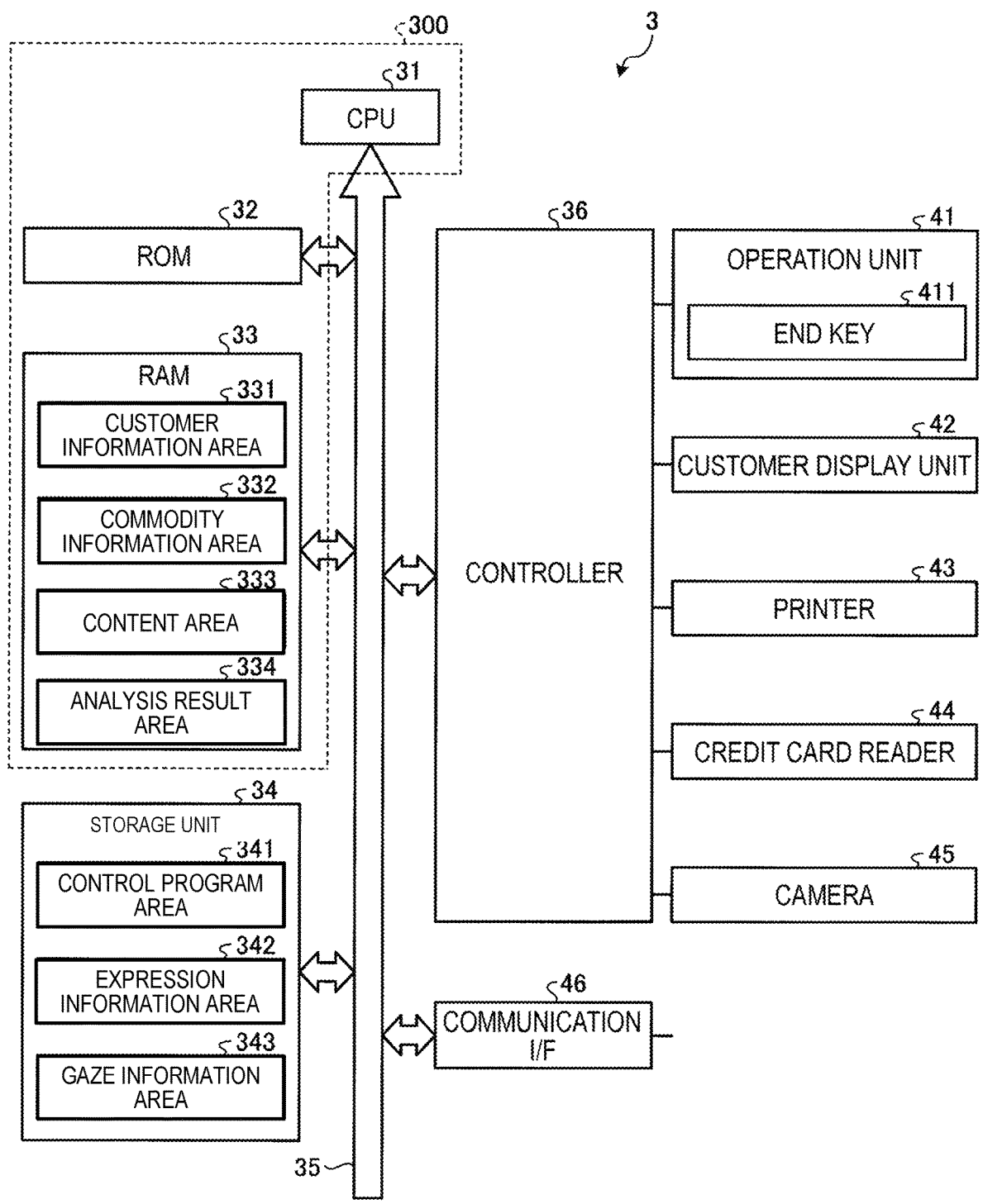
FIG. 3 is a hardware block diagram of a checkout device.

FIG. 3 is a hardware block diagram of the checkout device 3. The checkout device 3 includes a customer display unit 42 and a camera 45. The checkout device 3 captures the face image of the customer who is performing a checkout operation, with the camera 45. The checkout device 3 displays a promotional content on the customer display unit 42 for the customer who is performing the checkout operation. The checkout device 3 mainly displays the promotional content of a commodity suggested by the store.

Similarly to the commodity registration device 1, the checkout device 3 analyzes the customer's reaction with respect to the promotional content displayed on the customer display unit 42 based on the customer's face image captured by the camera 45. That is, the checkout device 3 scores the customer's expression with respect to the content based on the face expression of the customer looking at the content displayed on the customer display unit 42. The checkout device 3 scores the customer's expression with respect to the content based on the gaze degree of gazing the content displayed on the customer display unit 42.

The customer management device 5 receives and collects the sales information of the store generated through the sales registration processing performed by the commodity registration device 1 and the checkout processing performed by the checkout device 3, to manage the sales of the store.

Figure 4:
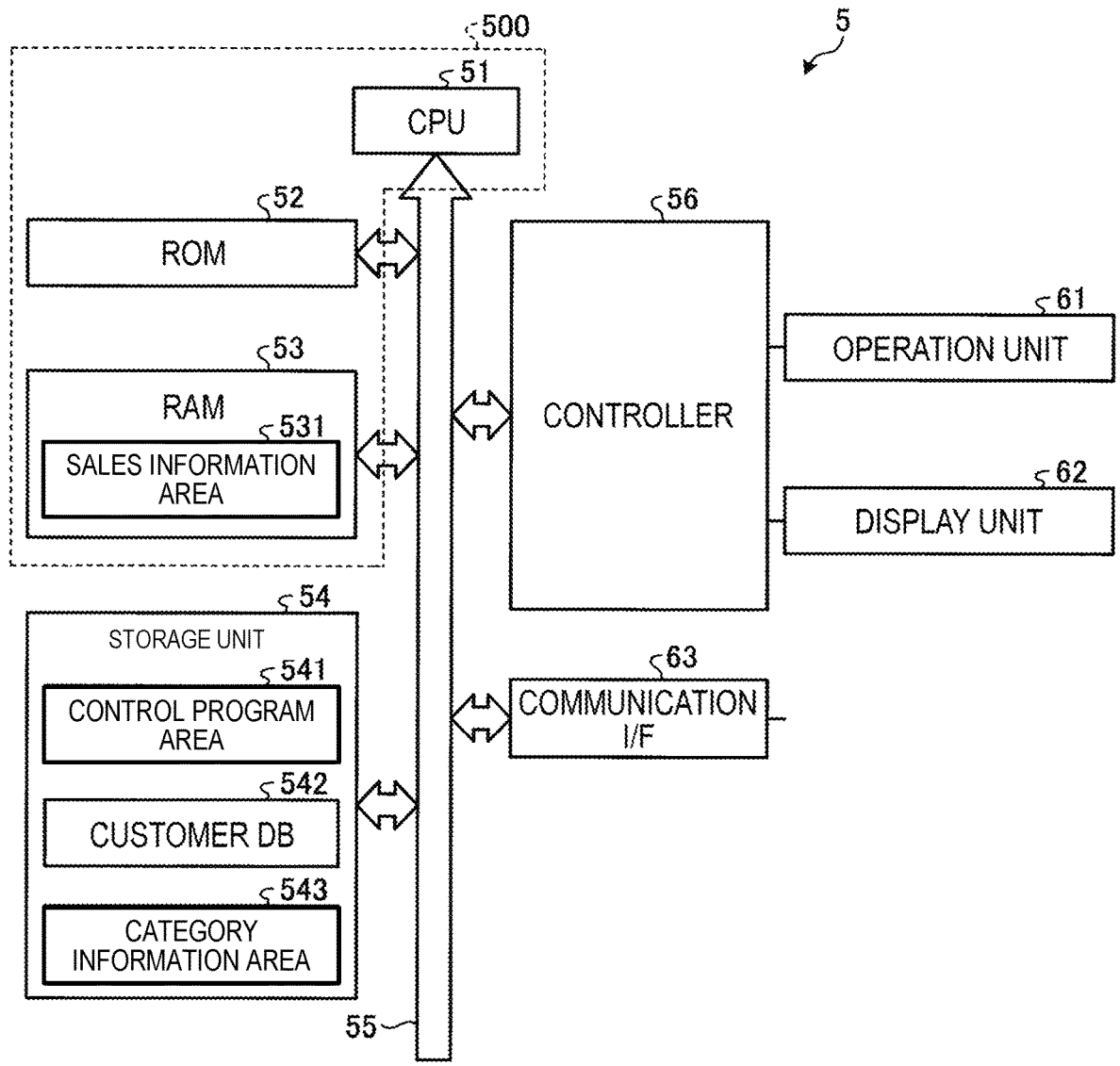
FIG. 4 is a hardware block diagram of a customer management device.

FIG. 4 is a hardware block diagram of the customer management device 5. The customer management device 5 includes a customer database (DB) 542. The customer DB 542 stores various kinds of information relating to each customer. For example, the customer DB 542 stores the purchase history of commodities that have been purchased by the customer. For example, the customer DB 542 stores the promotional content that has been displayed for the customer together with the score indicating the customer's smile degree. The customer management device 5 can be provided in the backroom of the store or the like. The customer management device 5 may operate as one or more servers. The customer management device 5 may be set up as a cloud system.

Hereinafter, the hardware of the commodity registration device 1 is described. As illustrated in FIG. 2, the commodity registration device 1 includes a central processing unit (CPU) 11, a read only memory (ROM) 12, a random access memory (RAM) 13, and the storage unit 14. The CPU 11 executes various programs. The ROM 12 stores various programs. The RAM 13 loads programs and various data. The storage unit 14 stores various programs. The CPU 11, the ROM 12, the RAM 13, and the storage unit 14 are connected to each other via a bus 15. The CPU 11, the ROM 12, and the RAM 13 make up a control unit 100. That is, the control unit 100 performs the control processing of the commodity registration device 1 described below, by the CPU 11 operating according to a control program that is stored in the ROM 12 or the storage unit 14 and loaded on the RAM 13.

The RAM 13 includes a customer information area 131, a commodity information area 132, a content area 133, and an analysis result area 134. The customer information area 131 stores customer identity (ID) for identifying a customer read by a customer card reader 24 (described below). The commodity information area 132 stores commodity information of the commodity that has been registered through the sales registration processing. The content area 133 stores one or more promotional contents that have been received from the customer management device 5 based on the customer ID stored in the customer information area 131 and in which the customer was interested in the past. The analysis result area 134 stores a total score of a score of the result obtained by analyzing the expression (which corresponds to the degree of interest) of the customer looking at the content displayed on the customer display unit 23 and a score based on the period of time for which the customer gazed the content.

The storage unit 14 is a hard disc drive (HDD), a flash memory, or the like and maintains data even if the power is turned off. The storage unit 14 includes a control program area 141, an expression information area 142, and a gaze information area 143. The control program area 141 stores one or more control programs for controlling the commodity registration device 1. The expression information area 142 stores scores indicating smile degrees (degrees of smile) corresponding to the kinds of the expressions (such as laughing, joy, smile, sadness, surprise, anger, scorn, fear, and expressionlessness). To obtain a smile degree means to determine a score of the smile degree. For example, the expression information area 142 stores a smile degree of +5 for laughing, a smile degree of +3 for joy, a smile degree of +1 for smile, a smile degree of 0 for expressionlessness, a smile degree of −1 for scorn, a smile degree of −3 for anger, and a smile degree of −5 for sadness, scorn, or fear. The gaze information area 143 stores periods of time for which the content has been gazed by the customer and the score indicating the smile degrees. For example, the gaze information area 143 stores +3 when a content is gazed for 5 seconds or longer, +1 when a content is gazed for 3 seconds to 5 seconds, 0 when a content is gazed for 1 second to 3 seconds, and −3 when a content is gazed for less than 1 second. To obtain the gaze degree means to determine a score based on the gazing time.

The commodity registration device 1 further includes a controller 16, an operation unit 21, a clerk display unit 22, the customer display unit 23, the customer card reader 24, the camera 25, and a symbol reading unit 26, which are connected via the bus 15. The operation unit 21 is a keyboard including a transfer key 211. The transfer key 211 is a key operated for transferring, to the checkout device 3, a customer ID stored in the customer information area 131, commodity information of the commodity stored in the commodity information area 132, content information stored in the content area 133, an analysis result (a total score) of the customer's expression with respect to the displayed content, which is stored in the analysis result area 134, and the like. The clerk display unit 22 displays information such as commodity information to the clerk. The customer display unit 23 displays the information such as commodity information to the customer. The customer display unit 23 displays the promotional content stored in the content area 133 for the customer. The customer card reader 24 reads the customer ID from a customer card that has been scanned or inserted. The camera 25 captures an image of the face of the customer standing in front of the commodity registration device 1. The symbol reading unit 26 reads, for example, a symbol such as a barcode which is attached to the commodity, optically or by image recognition. The commodity registration device 1 obtains a commodity code for identifying the commodity to which the symbol is attached based on the read symbol.

The control unit 100 is connected to a communication I/F 27 via the bus 15. The communication I/F 27 is connected to the checkout device 3 or the customer management device 5 via the communication line L, so that information can be mutually transmitted and received.

Subsequently, the details of the hardware of the checkout device 3 is described with reference to FIG. 3. As illustrated in FIG. 3, the checkout device 3 includes a CPU 31, a ROM 32, a RAM 33, a storage unit 34, and the like. The CPU 31 execute various programs. The ROM 32 stores various programs. The RAM 33 loads programs or various kinds of data. The storage unit 34 stores various programs. The CPU 31, the ROM 32, the RAM 33, and the storage unit 34 are connected to each other via a bus 35. The CPU 31, the ROM 32, and the RAM 33 make up a control unit 300. That is, the control unit 300 performs control processing of the checkout device 3 described below by the CPU 31 operating a control program that is stored in the ROM 32 or the storage unit 34 and loaded on the RAM 33.

The RAM 33 includes a customer information area 331, a commodity information area 332, a content area 333, and an analysis result area 334. The customer information area 331 stores the customer ID that has been received from the commodity registration device 1. The commodity information area 332 stores the commodity information that has been received from the commodity registration device 1. The content area 333 stores the promotional contents that have been received from the commodity registration device 1. The analysis result area 334 stores the total score that has been received from the commodity registration device 1.

The storage unit 34 is an HDD, a flash memory, or the like, and maintains data even if the power is turned off. The storage unit 34 includes a control program area 341, an expression information area 342, and a gaze information area 343. The control program area 341 stores one or more control programs for controlling the checkout device 3. The expression information area 342 stores the same information as the expression information area 142. The gaze information area 343 stores the same information as the gaze information area 143.

The checkout device 3 includes a controller 36, an operation unit 41, the customer display unit 42, a printer 43, a credit card reader 44, and the camera 45, which are connected via the bus 35. The operation unit 41 is a keyboard including an end key 411. The end key 411 is a key operated by the customer for ending the checkout operation. The customer display unit 42 displays information such as commodity information to the customer. The customer display unit 42 displays the promotional content stored in the content area 333 to the customer. The printer 43 prints the customer ID stored in the customer information area 331, the commodity information stored in the commodity information area 332, and the checkout information calculated based on the commodity information to issue a receipt. The credit card reader 44 reads information according to the credit processing from the credit card which has been scanned or inserted. The camera 45 captures an image of the face of the customer standing in front of the checkout device 3.

The control unit 300 is connected to a communication I/F 46 via the bus 35. The communication I/F 46 is connected to the commodity registration device 1 or the customer management device 5 via the communication line L, so that information can be mutually transmitted and received.

Subsequently, the details of the hardware of the customer management device 5 is described with reference to FIG. 4. As illustrated in FIG. 4, the customer management device 5 includes a CPU 51, a ROM 52, a RAM 53, a storage unit 54, and the like. The CPU 51 executes various programs. The ROM 52 stores various programs. The RAM 53 loads programs or various kinds of data. The storage unit 54 stores various programs. The CPU 51, the ROM 52, the RAM 53, and the storage unit 54 are connected to each other via a bus 55. The CPU 51, the ROM 52, and the RAM 53 make up a control unit 500. That is, the control unit 500 performs control processing of the customer management device 5 described below by the CPU 51 operating according to the control program that is stored in the ROM 52 or the storage unit 54 and loaded on the RAM 53.

The RAM 53 includes a sales information area 531. The sales information area 531 stores sales information (that is, commodity information and checkout information) received from the checkout device 3.

The storage unit 54 is an HDD or a flash memory and maintains data even if the power is turned off. The storage unit 54 includes a control program area 541, the customer DB 542, and a category information area 543. The control program area 541 stores one or more control programs for controlling the customer management device 5. The customer DB 542 is described below with FIGS. 5 and 6. The category information area 543 is described below with FIG. 7.

The customer management device 500 includes a controller, an operation unit 61 and a display unit 62, which are connected via the bus 55. The operation unit 61 is a keyboard. The display unit 62 displays information to an operator.

The control unit 500 is connected to a communication I/F 63 via the bus 55. The communication I/F 63 is connected to the commodity registration device 1 or the checkout device 3 via the communication line L, so that information can be mutually transmitted and received.

Figure 5:
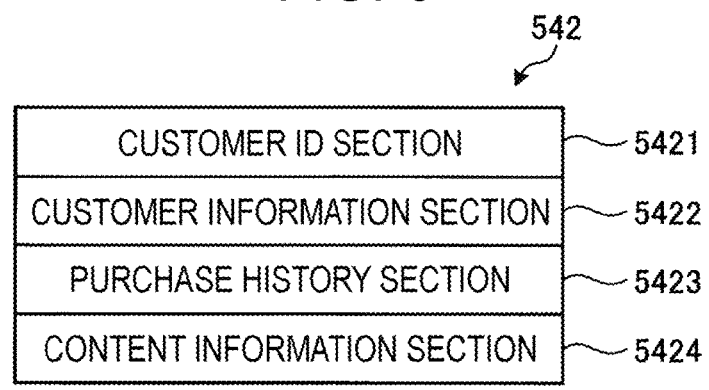
FIG. 5 is a diagram illustrating a structure of a customer database (DB).

Hereinafter, the customer DB 542 is described. FIG. 5 is a diagram illustrating the structure of the customer DB 542. As illustrated in FIG. 5, the customer DB 542 includes a customer ID section 5421, a customer information section 5422, a purchase history section 5423, and a content information section 5424. The customer ID section 5421 stores the customer ID for identifying the customer. The customer information section 5422 stores various kinds of information (such as names, addresses, telephone numbers, dates of birth, or family members) of the customer which is identified by the customer ID stored in the customer ID section 5421. The purchase history section 5423 stores the commodity information of the commodity that has been purchased in the past by the customer identified with the customer ID stored in the customer ID section 5421. The content information section 5424 stores the promotional content that has been displayed in the past to the customer identified with the customer ID stored in the customer ID section 5421. For example, a promotional content that is no longer required to be displayed to the customer (for example, an old advertisement for a commodity of which a special offer period is over) is deleted from the content information section 5424 by the control unit 100.

Subsequently, the content information section 5424 is described. FIG. 6 is a diagram illustrating subsections included in a content information section 5424. As illustrated in FIG. 6, the content information section 5424 includes a content section 54241, a purchase commodity section 54242, a score section 54243, and a category storage section 54244. The content section 54241 stores the promotional content that has been displayed to the customer. The content stored in the content section 54241 includes the attribute information about customers. The purchase commodity section 54242 stores the commodity information of the commodity that was purchased by the customer when the promotional content was displayed. The score section 54243 stores a total score of the smile degree and the gaze degree that were obtained by analyzing the customer's expression when the content stored in the content section 54241 was displayed. The category storage section 54244 stores a category of the content that is stored in the score section 54243 and of which the total score is a predetermined value or higher. The category is extracted from the category information area 543 described below.

Subsequently, the category information area 543 is described below. FIG. 7 is a diagram illustrating a structure of data stored in the category information area 543. As illustrated in FIG. 7, the category information area 543 associate a category or a classification with a plurality of commodity codes and promotional contents. The category information area 543 includes a category code section 5431, a commodity code section 5432, and a content section 5433. The category code section 5431 stores category codes for identifying categories. The commodity code section 5432 stores commodity codes of commodities each belonging to one of categories indicated by a category code. The content section 5433 stores one or more promotional contents each belonging to one of categories. For example, when "category 1" is a category of drinking water, the commodity code section 5432 stores commodity codes of the commodities relating to drinking water. The content section 5433 stores the plurality of promotional contents (for example, commercials of drinking water) relating to drinking water. That is, the content is a content relating to the commodity stored in the commodity code section 5432. The content stored in the content section 5433 includes the attribute information about customers.

Figure 8:
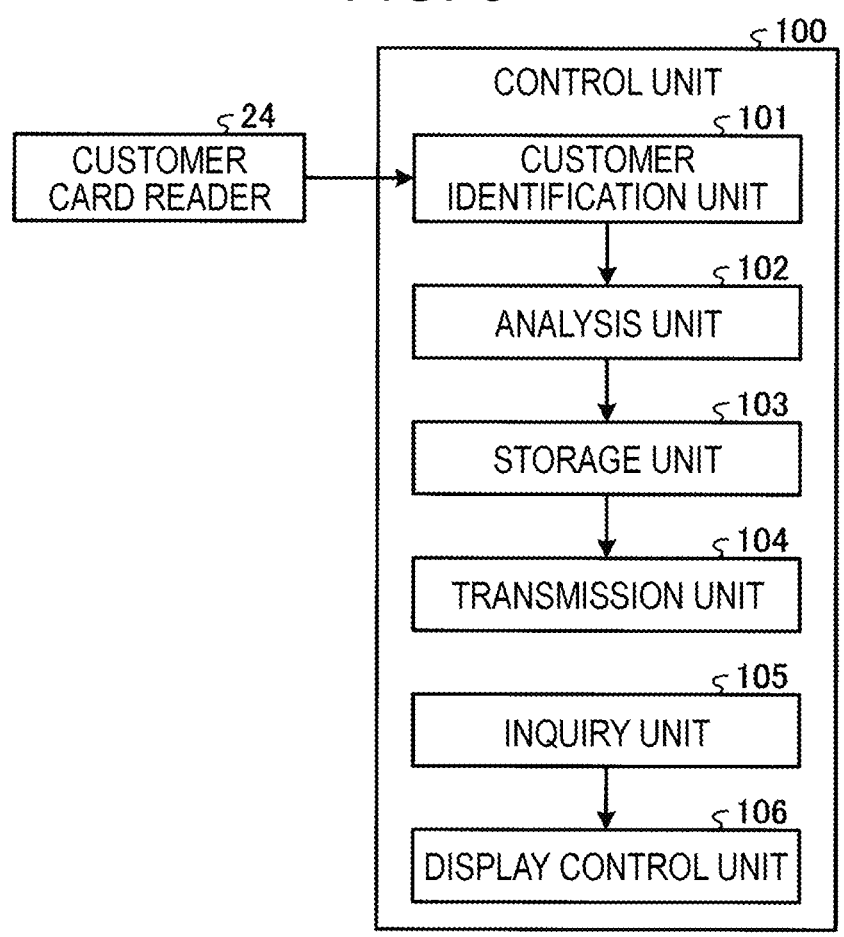
FIG. 8 is a functional block diagram of the commodity registration device.

Hereinafter, the functional configuration of the commodity registration device 1 is described below. FIG. 8 is a functional block diagram of the commodity registration device 1. As illustrated in FIG. 8, the control unit 100 of the commodity registration device 1 performs functions of a customer identification unit 101, an analysis unit 102, a storage unit 103, a transmission unit 104, an inquiry unit 105, and a display control unit 106 according to control programs that are stored in the control program area 141 and loaded on the RAM 13.

The customer identification unit 101 identifies a customer. Specifically, the customer identification unit 101 identifies the customer by the customer ID read by the customer card reader 24 and stores the customer ID in the customer information area 131.

Based on a captured image of the customer looking at a promotional content displayed on the customer display unit 23, the analysis unit 102 analyzes the interest degree of the customer looking at the content. Specifically, the analysis unit 102 obtains the smile degree and the gaze degree (degree of gazing time) of the customer based on the captured image of the camera 25.

The storage unit 103 stores a result of the analysis performed by the analysis unit 102 in the analysis result area 134 together with the displayed promotional content.

The transmission unit 104 controls the communication interface 27 to transmit the stored promotional content and the analysis results the checkout device 3 in association with the customer ID.

The inquiry unit 105 controls the communication interface 27 to transmit an inquiry about a promotional content to be displayed to the customer to the customer management device 5 using the customer ID identified by the customer identification unit 101. When any content that has attracted the customer's interest before is not stored in the content area 133, the inquiry unit 105 controls the communication interface 27 to transmit an inquiry about a promotional content corresponding to the category including the commodity that has been most recently registered.

The display control unit 106 controls the customer display unit 23 to display the promotional content stored in the customer DB 542. Specifically, the display control unit 106 controls the customer display unit 23 to display the promotional content retrieved by the customer management device 5 from the customer DB 542 in response to the inquiry issued by the inquiry unit 105.

Figure 9:
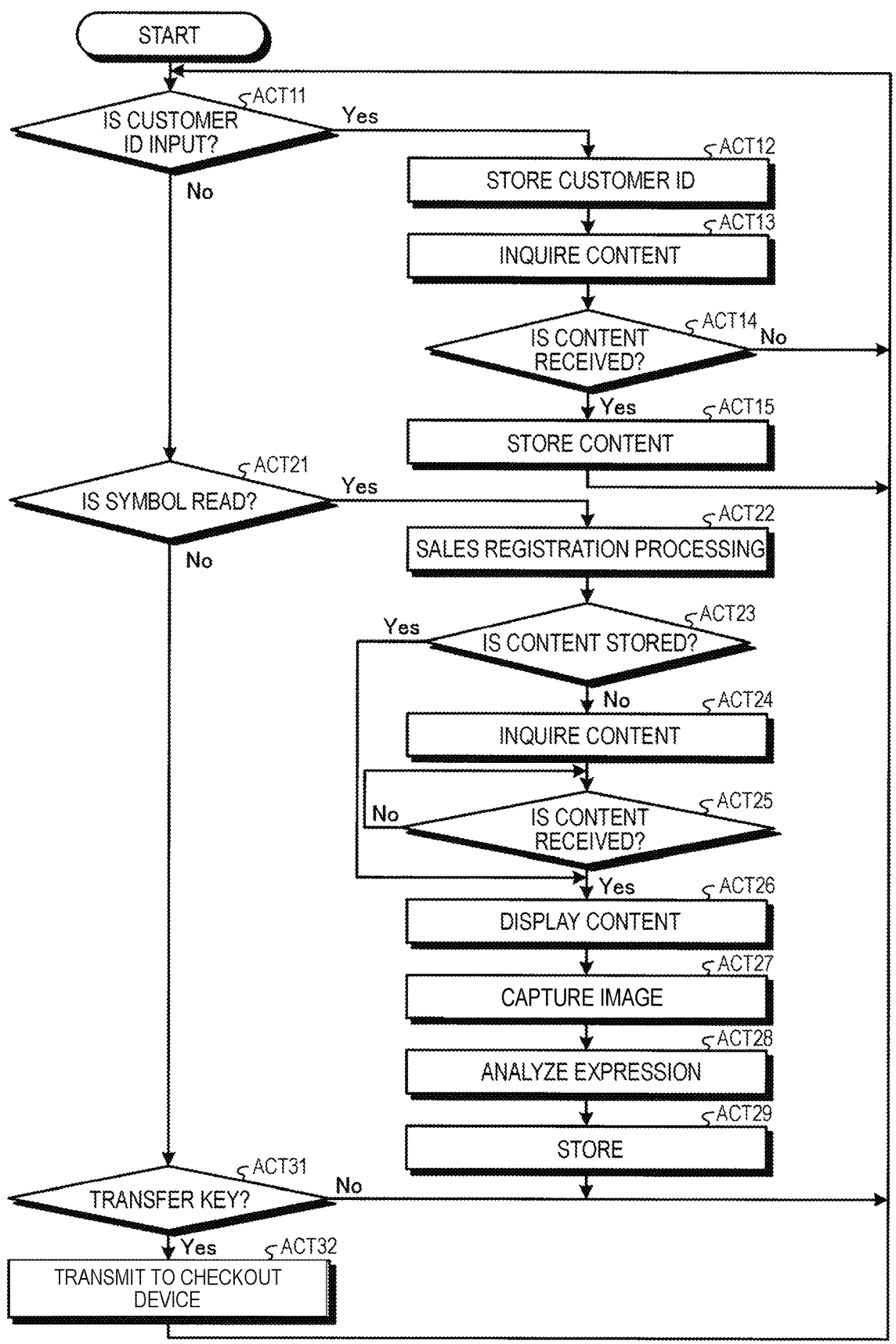
FIG. 9 is a flowchart of control processing of a commodity registration device.

Hereinafter, control processing performed by the commodity registration device 1 is described. FIG. 9 is a flowchart of the control processing performed by the commodity registration device 1. As illustrated in FIG. 9, the control unit 100 of the commodity registration device 1 determines whether the customer ID stored in the customer card has been input by the customer card reader 24 (ACT11). When it is determined that the customer ID has been input (Yes in ACT11), the customer identification unit 101 stores the read customer ID in the customer information area 131 (ACT12).

Subsequently, based on the customer ID stored in the customer information area 131, the inquiry unit 105 controls the communication interface 27 to transmit an inquiry about one or more promotional contents which are stored in the customer DB 542 and in which the customer has been interested before (ACT13). The control unit 100 determines whether any content has been received in response to the inquiry (ACT14). When it is determined that the content has been received (Yes in ACT14), the control unit 100 stores the received content in the content area 133 (ACT15). Then, the control unit 100 returns to ACT11. When it is determined the content has not been received (No in ACT14), the control unit 100 returns to ACT11.

When it is determined that the customer ID has not been input (No in ACT11), the control unit 100 determines whether a symbol attached to a commodity has been read by the symbol reading unit 26 (ACT21). When it is determined that the symbol attached to the commodity has been read (Yes in ACT21), the control unit 100 obtains the commodity code based on the read symbol and performs sales registration processing relating to the commodity (ACT22). Subsequently, the control unit 100 determines whether the content has been stored in the content area 133 in the processing of ACT15 (ACT23). When it is determined that the content has not been stored in the content area 133 in the processing of ACT15 (No in ACT23), the inquiry unit 105 controls the communication interface 27 to transmit to the customer management device 5 an inquiry about the content corresponding to the category including the commodity that has been registered by the sales registration processing in ACT22 (ACT24). The control unit 100 determines whether the content has been received from the customer management device 5 (ACT25). When the content has been received from the customer management device 5 (Yes in ACT25), the control unit 100 stores the received content in the content area 133. The display control unit 106 controls the customer display unit 23 to display the content stored in the content area 133 (ACT26).

Subsequently, the control unit 100 controls the camera 25 to capture an image of the face of the customer looking at the content being displayed on the customer display unit (ACT27). Subsequently, the analysis unit 102 analyzes the customer's interest degree in the content based on the captured image (ACT28). That is, the analysis unit 102 obtains the customer's smile degree based on the expression of the face of the customer looking at the content displayed on the customer display unit 23. The analysis unit 102 further obtains the gaze degree of the customer looking at the content displayed on the customer display unit 23.

Subsequently, the storage unit 103 stores the smile degree and the gaze degree (that is, the interest degree) analyzed by the analysis unit 102 in the analysis result area 134 in association with the displayed promotional content (ACT29). Then, the control unit 100 returns to ACT11. The processing of ACT22 to ACT29 is performed whenever the symbol is read in ACT21. In the processing of ACT23, when it is determined that one or more contents have been stored in the content area 133 in ACT15, the control unit 100 performs the processing of ACT26 to ACT29 without performing the processing of ACT24 and ACT25. That is, the display control unit 106 controls the customer display unit 23 to display the content stored in the content area 133 (ACT26). The control unit 100 controls the camera 25 to capture the image of the face of the customer looking at the content displayed on the customer display unit 23 (ACT27). Subsequently, the analysis unit 102 analyzes the customer's expression based on the captured image (ACT28). Subsequently, the storage unit 103 stores the result of the analysis performed by the analysis unit 102, in the analysis result area 134 (ACT29). The control unit 100 returns to ACT11.

When it is determined that the symbol attached to the commodity has not read (No in ACT21), the control unit 100 determines whether the transfer key 211 has been operated (ACT31). When it is determined that the transfer key 211 has been operated (Yes in ACT31), the transmission unit 104 controls the communication interface 27 to transmit the customer ID stored in the customer information area 131, the commodity information stored in the commodity information area 132, the content stored in the content area 133, the analysis results of the content which are stored in the analysis result area 134, to the checkout device 3 (ACT32). The control unit 100 returns to ACT11. When it is determined that the transfer key 211 has not been operated (No in ACT31), the control unit 100 returns to ACT11.

Figure 10:
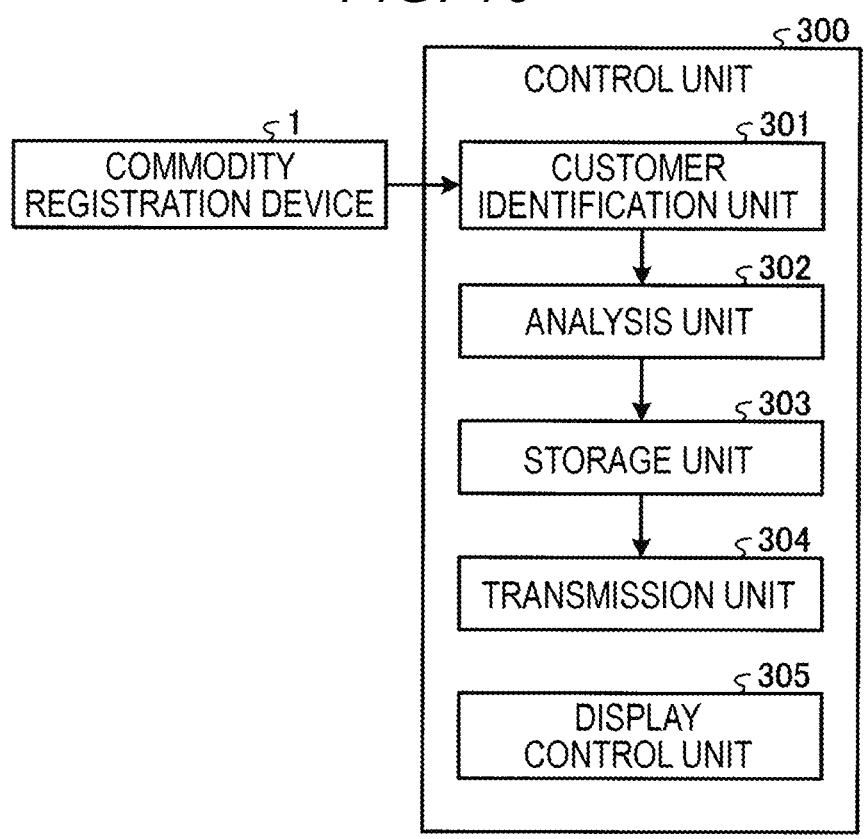
FIG. 10 is a functional block diagram of a checkout device.

Hereinafter, the functional configuration of the checkout device 3 is described. FIG. 10 is a functional block diagram of the checkout device 3. As illustrated in FIG. 10, the control unit 300 of the checkout device 3 performs functions of a customer identification unit 301, an analysis unit 302, a storage unit 303, a transmission unit 304, and a display control unit 305 according to the control programs that are stored in the control program area 341 and loaded on the RAM 33.

The customer identification unit 301 identifies a customer. Specifically, the customer identification unit 301 identifies the customer by receiving the customer ID from the commodity registration device 1, and stores the customer ID in the customer information area 331.

The analysis unit 302 analyzes the customer's expression based on a captured image of the customer looking at a promotional content displayed on the customer display unit 42. Specifically, the analysis unit 302 analyzes the smile degree and the gaze degree of the customer based on the captured image of the customer looking at the content displayed on the customer display unit 42.

The storage unit 303 stores the results of the analysis performed by the analysis unit 302, in the analysis result area 334 together with the displayed promotional content.

The transmission unit 304 controls the communication interface 46 to transmit the content stored in the storage unit 303 and the analysis results to the customer management device 5 in association with the customer ID.

The display control unit 305 controls the customer display unit 42 to display the content stored in the content area 333. Specifically, the display control unit 305 controls the customer display unit 42 to display the content that has not been displayed on the commodity registration device 1, for example, that relates to the commodity suggested by the store, among the contents stored in the content area 333 on the customer display unit 42.

Figure 11:
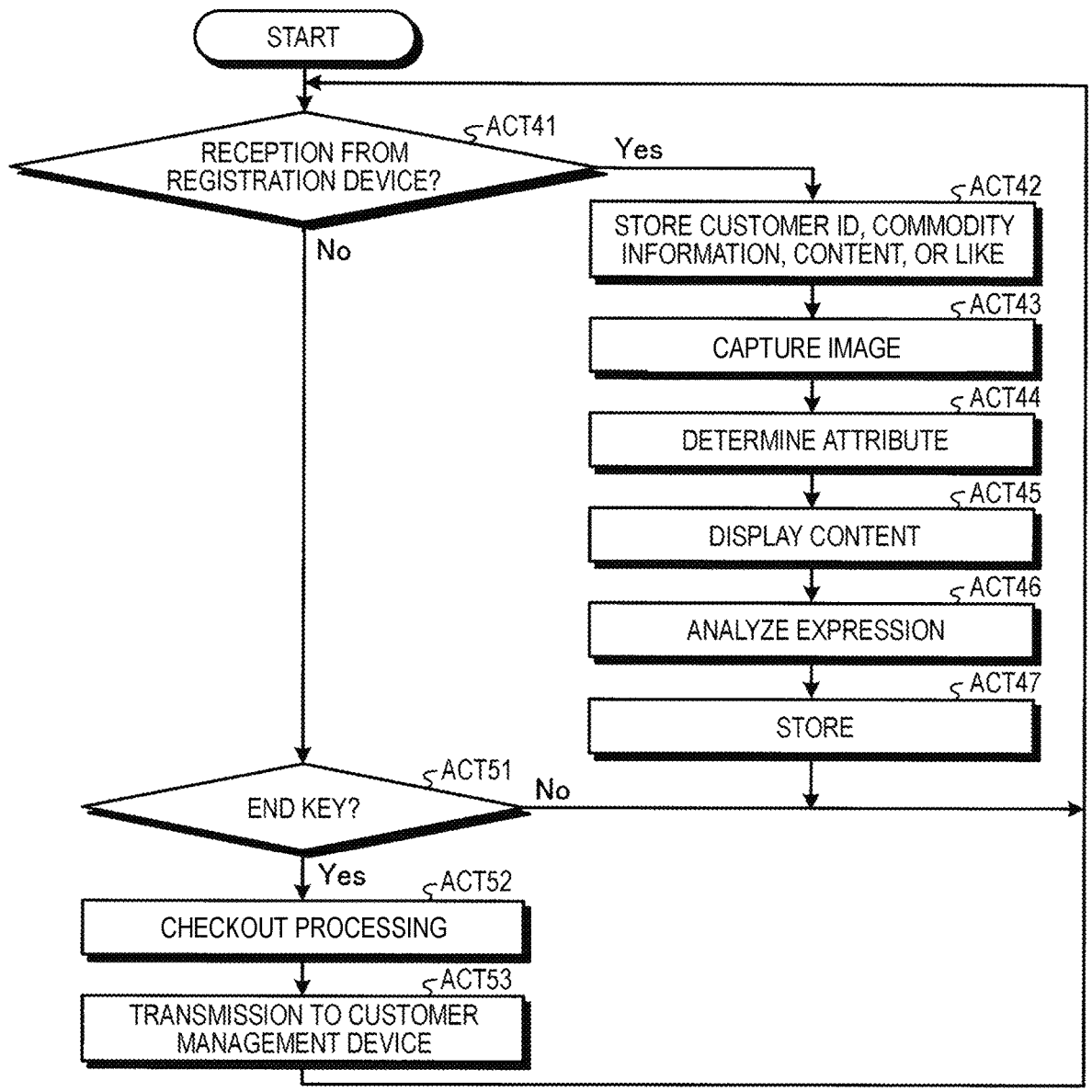
FIG. 11 is a flowchart of control processing of a checkout device.

Hereinafter, control processing performed by the checkout device 3 is described. FIG. 11 is a flowchart of the control processing performed by the checkout device 3. As illustrated in FIG. 11, the control unit 300 of the checkout device 3 determines whether a customer ID, commodity information, one or more promotional contents, and an analysis result of the content have been received from the commodity registration device 1 (ACT41). When it is determined that the above information have been received (Yes in ACT41), the customer identification unit 301 stores the received customer ID in the customer information area 331, the received commodity information in the commodity information area 332, the received contents in the content area 333, and the received analysis result in the analysis result area 334 (ACT42).

Subsequently, the control unit 300 controls the camera 45 to capture an image of the customer's face (ACT43). The control unit 300 determines the customer's attributes (e.g., sex, age, age group, or the like) based on the captured image of the customer's face (ACT44). The control unit 300 searches the content area 333 using the determined attribute of the customer, extracts a promotional content suitable for the determined attribute of the customer, and controls the customer display unit 42 to display the extracted content (ACT45).

Subsequently, the analysis unit 302 analyzes the customer's expression based on images of the customer's face which are being captured after the processing of ACT43 (ACT46). That is, the analysis unit 302 obtains the customer's smile degree based on the expression of the face of the customer looking at the content displayed on the customer display unit 42. The analysis unit 302 obtains the gaze degree of the customer looking at the content displayed on the customer display unit 42. Subsequently, the storage unit 303 stores the smile degree and the gaze degree analyzed by the analysis unit 302 in the analysis result area 334 in association with the displayed content (ACT47). Then, the control unit 300 returns to ACT41.

In this manner, for example, when a child of a parent does a shopping by using a point card of the parent whose customer ID is stored, an image of the face of the child is picked up in ACT43. In the processing of ACT45, it is possible to display a promotional content suitable for the child whose image has been captured.

When it is determined that the customer ID, the commodity information, the promotional content, or the analysis result of the content has not been received (No in ACT41), the control unit 300 determines whether the end key 411 has been operated (ACT51). When it is determined that the end key 411 has been operated (Yes in ACT51), the control unit 300 performs checkout processing based on commodity information stored in the commodity information area 332 (ACT52). The control unit 300 controls the communication interface 46 to transmit, to the customer management device 5, the customer ID stored in the customer information area 331, the commodity information stored in the commodity information area 332, the sales information including the checkout information and the commodity information, the content stored in the content area 333, and the analysis results stored in the analysis result area 334 (ACT53). Then, the control unit 300 returns to ACT41.

Figure 12:
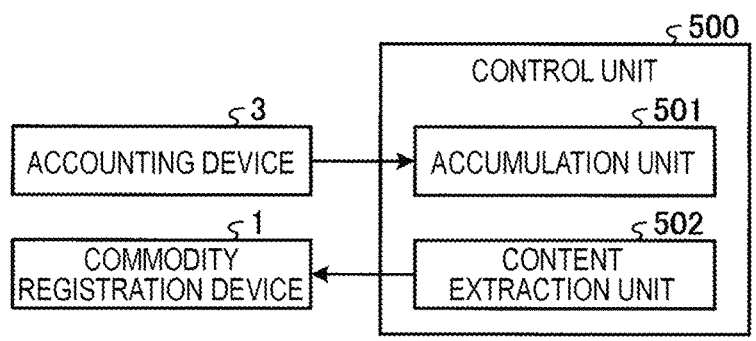
FIG. 12 is a functional block diagram of a customer management device.

Hereinafter, the functional configuration of the customer management device 5 is described. FIG. 12 is a functional block diagram of the customer management device 5. As illustrated in FIG. 12, the control unit 500 of the customer management device 5 performs functions of an accumulation unit 501 and a content extraction unit 502 according to the control programs stored in the control program area 541 and loaded on the RAM 53.

The accumulation unit 501 accumulates promotional contents determined to attract a customer's interest by the analysis unit 102 and the analysis unit 302 in association with the customer's ID. Specifically, the accumulation unit 501 accumulatively stores the contents in the customer DB in association with the customer ID received from the checkout device 3 and the analysis results. That is, the accumulation unit 501 accumulatively stores the received content in the content section 54241 identified with the customer ID. The accumulation unit 501 stores the received commodity information in the purchase commodity section 54242 corresponding to the content section 54241 storing the content. The accumulation unit 501 stores a total value of the smile degree and the gaze degree of the analysis result in the score section 54243 corresponding to the content section 54241 storing the content.

Upon receipt of an inquiry about the content from the commodity registration device 1 in ACT13, the content extraction unit 502 searches the customer DB 542, read out from the content section 54241 the content of which the score stored in the score section 54243 is greater than or equal to the predetermined value, and controls the communication interface 63 to transmit the content to the commodity registration device 1. The content of which the score is greater than or equal to the predetermined value is the content in which the customer is interested. Any predetermined value may be used. Upon receipt of an inquiry about the content from the commodity registration device 1 in ACT24, the content extraction unit 502 controls the communication interface 63 to transmit, to the commodity registration device 1, a content stored in the content section 5433 corresponding to the category including the most-recently purchased commodity.

Figure 13:
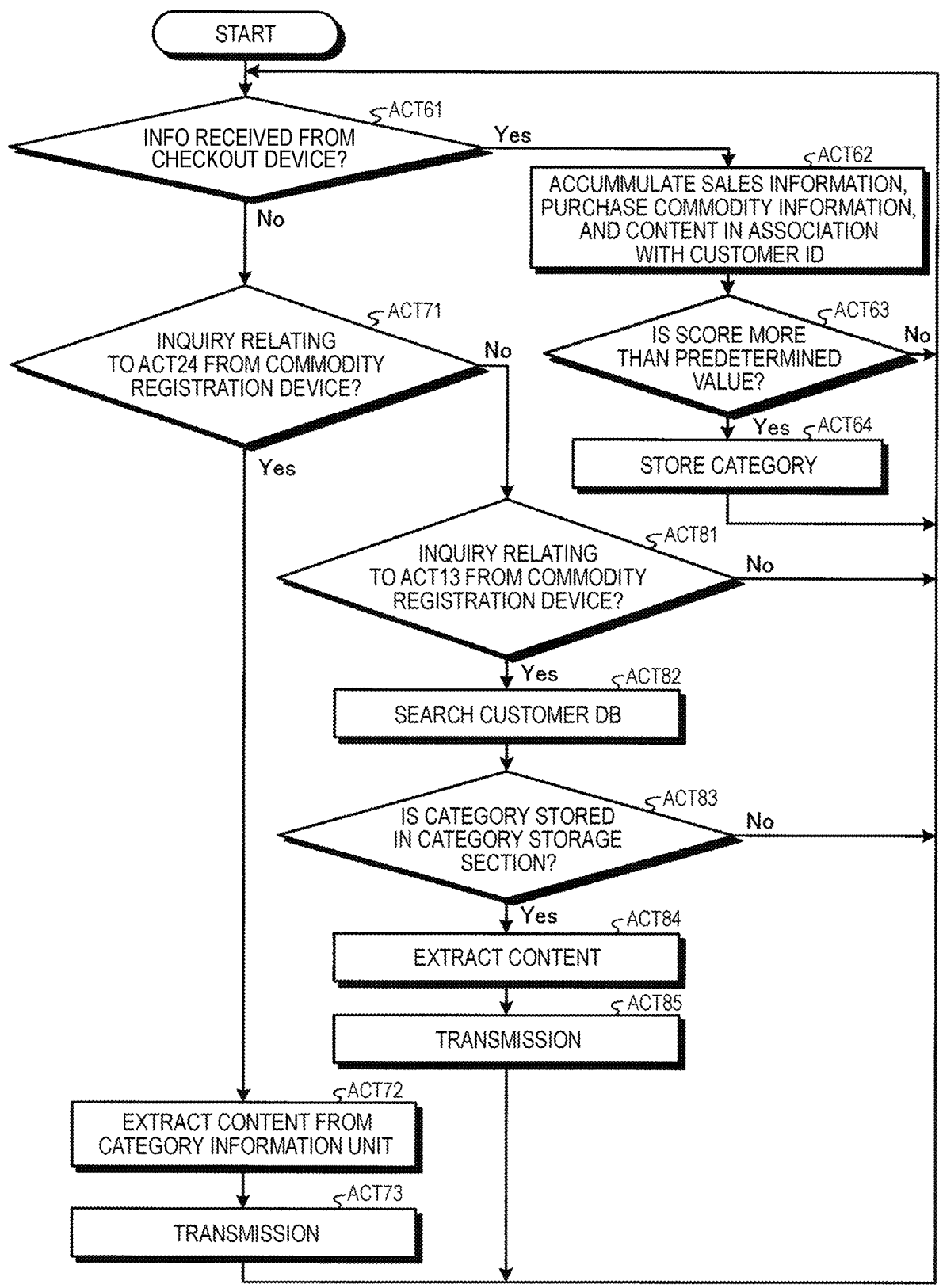
FIG. 13 is a flowchart of control processing of a customer management device.

Hereinafter, control processing performed by the customer management device 5 is described. FIG. 13 is a flowchart of the control processing performed by the customer management device 5. As illustrated in FIG. 13, the control unit 500 of the customer management device 5 determines whether the customer ID, the commodity information, the sales information, and the analysis result, which are transmitted from the checkout device 3 in ACT53, have been received (ACT61). When it is determined that the customer ID, the commodity information, the sales information, the content, and the analysis result have been received (Yes in ACT61), the accumulation unit 501 of the control unit 500 stores the sales information in the sales information area 531, stores the received content in the content section 54241 of the customer DB 542 in accordance with the received customer ID, stores the received commodity information in the purchase commodity section 54242 corresponding to the content section 54241 storing the received content, stores the total score of the smile degree and the gaze degree of analysis result in the score section 54243 corresponding to the content section 54241 storing the received content (ACT62). Then, the control unit 500 returns to ACT61.

Subsequently, the control unit 500 determines that the total score stored in the score section 54243 is greater than or equal to the predetermined value (ACT63). The total score greater than or equal to the predetermined value indicates that the smile degree and the gaze degree of the customer who has looked at the content are high. When it is determined that the total score stored in the score section 54243 is greater than or equal to the predetermined value (Yes in ACT63), the control unit 500 determines a category to which the content belongs from the category information area 543. The control unit 500 stores the determined category in the category storage section 54244 (ACT64). Then, the control unit 500 returns to ACT61. When it is determined that the total score stored in the score section 54243 is less than the predetermined value (No in ACT63), the control unit 500 returns to ACT61.

When it is determined that the customer ID, the commodity information, the sales information, the content, and the analysis result relating to the processing of ACT53 have not been received (No in ACT61), the control unit 500 determines whether the inquiry of the content relating to the processing of ACT24 has been received from the commodity registration device 1 (ACT71). When it is determined that the inquiry of the content relating to the processing of ACT24 has been received (Yes in ACT71), the content extraction unit 502 extracts one of the contents belonging to the category which are stored in the category information area 543 and to which the most-recently purchased commodity belongs, from the content section 5433 (ACT72). In ACT72, for example, the control unit 500 randomly extracts a content from the content section 5433. For example, the control unit 500 extracts a content of which the smile degree or the gaze degree is generally high from the content section 5433. The control unit 500 controls the communication interface 63 to transmit the extracted content to the commodity registration device 1 (ACT73). Then, the control unit 500 returns to ACT61.

When it is determined that the inquiry of the content relating to the processing of ACT24 has not been received (No in ACT71), the control unit 500 determines whether the inquiry of the content relating to the processing of ACT13 has been received from the commodity registration device 1 (ACT81). When it is determined that the inquiry of the content relating to the processing of ACT13 has been received (Yes in ACT81), the control unit 500 searches the customer DB 542 (ACT82) and determines whether the category is stored in the category storage section 54244 (ACT83). When it is determined that the category is stored in the category storage section 54244 (Yes in ACT83), the content extraction unit 502 extracts one of the contents (that is, the content relating to the content in which the customer is interested) belonging to the category stored in the category storage section 54244 from the content section 5433 (ACT84). In ACT84, the control unit 500 randomly extracts a content, for example, from the content section 5433. The control unit 500 extracts a content of which the smile degree or the gaze degree is generally high, for example, from the content section 5433. The control unit 500 controls the communication interface 63 to transmit the extracted content to the commodity registration device 1 (ACT85). The, the control unit 500 returns to ACT61.

When it is determined that the inquiry of the content relating to the processing of ACT13 has not been received (No in ACT81), the control unit 500 returns to ACT61. When is determined that there is no content of which the score is greater than or equal to the predetermined value is not stored (No in ACT83), the control unit 500 returns to ACT61 without transmitting any content.

According to the information processing system of such an embodiment, the analysis unit 102 and the analysis unit 302 analyze the customer's expression with respect to the displayed promotional content, and the analysis results are accumulatively stored in the customer DB 542. Therefore, by displaying the content relating to the content in which the customer is interested, it is possible to provide the customer with the content in which the customer is highly likely to be interested.

According to the aforementioned embodiments, a promotional content of which its total score is greater than or equal to a predetermined value is displayed to a customer among contents accumulatively stored in the customer DB 542. Thus, it is possible to provide the customer with the content in which the customer is highly likely to be interested.

In the aforementioned embodiments, the customer management device 5 accumulatively stores all contents (that is, each item of content that attracted or did not attract a customer's interest) received from the checkout device 3 together with the analysis results. Alternatively, the customer management device 5 may store only the those items of content for which the total values of the analysis results of the contents received from the checkout device 3 are greater than or equal to the predetermined value (that is, those items of content that attracted the customer's interest).

In the aforementioned embodiments, in the processing of ACT43 to ACT45, an image of the customer's face is captured, the attribute of the customer is determined from the captured image, and the content suitable for the customer's attribute is displayed, but this processing can be omitted in some embodiments. Alternatively, the customer's attribute(s) may be obtained based on a customer ID stored in the customer information area 331 in ACT42, to extract and display the content suitable for the customer's corresponding attribute(s).

In the aforementioned embodiments, the smile degree and the gaze degree are both used as proxies for the degree of interest. However, in some embodiments, either one of the smile degree or the gaze degree alone may be used as the proxy for the degree of interest.

In the aforementioned embodiments, the customer management device 5 stores the customer DB 542. However, the customer DB 542 may be stored in a device other than the customer management device 5.

In the aforementioned embodiments, the commodity registration device 1 and the checkout device 3 have a camera 25 and a camera 45, respectively. However, in some embodiments, the camera(s) may be positioned elsewhere, for example, on the ceiling of the store, and, in general, as long as a camera can capture an image of the customer looking at the promotional content displayed on the commodity registration device 1 or the checkout device 3, any placement can be adopted.

In the aforementioned embodiments, the information processing device was described as a commodity registration device 1 and an checkout device 3 in the semi-self-service POS system. However, in some embodiments, the information processing device may be either one of the commodity registration device 1 or the checkout device 3 of the semi-self-service POS system. The information processing device may be, for example, a self-service POS terminal at which all operations are performed by a customer or a conventional POS terminal at which all operations are performed by a clerk.

In the aforementioned embodiments, an "analysis unit" is provided in each of the commodity registration device 1 and the checkout device 3. However, in some embodiments, an "analysis unit" may also or instead be provided in the customer management device 5.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity registration device of a point of sale (POS) system, comprising:
    a display for a customer to which an imaging device is attached;
    a scanner by which a symbol attached to a commodity is scanned;
    a memory; and
    a processor configured to:
        acquire a customer ID for identifying a customer;
        upon scanning of a symbol by the scanner, generate a screen for the display including a promotional content about a commodity, control the imaging device to capture an image of the customer facing the display, and analyze the captured image of the customer's face;
        determine a degree of customer interest with respect to the displayed promotional content according to the analysis of the captured image;
        output the customer ID and the determined degree of customer interest in association with the displayed promotional content to an external device that searches for promotional content having a previously determined degree of customer interest that is greater than or equal to a threshold value; and
        generate a screen for display, showing the promotional content that the external device found by the search.

2. The commodity registration device according to claim 1
    wherein
    the processor is further configured to store in the memory a commodity ID of the commodity that has been scanned during the display of the promotional content.

3. The commodity registration device according to claim 2, wherein the processor is further configured to, when promotional content having a degree of customer interest that is greater than or equal to the threshold value is not found by the search, generate a screen for display, showing promotional content associated with a most recently stored content ID.

4. The commodity registration device according to claim 3, wherein the processor is further configured to:
    determine personal attributes of the customer from the captured image, and
    select promotional content for display based on the determined personal attributes.

5. The commodity registration device according to claim 2, wherein the processor is further configured to:
    acquire commodity information associated with the commodity ID; and
    output to the external device the commodity information in association with the commodity ID.

6. The commodity registration device according to claim 5, wherein the commodity information is stored in the external device in association with the displayed promotional content, the customer ID, and the degree of customer interest.

7. The commodity registration device according to claim 1, wherein the processor detects facial expressions of the customer and measures a gazing time for the customer gazing at the display to determine the degree of customer interest.

8. The commodity registration device according to claim 1, further comprising:
    a printer, wherein
    the processor is configured to control the printer to issue a receipt.

9. The commodity registration device according to claim 1, wherein the processor is further configured to, when the determined degree of customer interest is greater than or equal to the threshold value, determine a category to which the displayed promotional content belongs and output the determined category in association with the displayed promotional content.

10. An information processing method performed by a commodity registration device of a point of sale (POS) system, the device including a memory, a display for a customer to which an imaging device is attached, and a scanner by which a symbol attached to a commodity is scanned, the method comprising:
    acquiring a customer ID for identifying a customer;
    upon scanning of a symbol by the scanner, displaying on the display a screen showing a promotional content about a commodity, controlling the imaging device to capture an image of the customer facing the display, and analyzing the captured image of the customer's face;
    determining a degree of customer interest with respect to the displayed promotional content based on the analysis of the captured image;
    outputting the customer ID and the determined degree of customer interest in association with the displayed promotional content to an external device that searches for promotional content having a previously determined degree of customer interest that is greater than or equal to a threshold value; and
    displaying on the display a screen showing the promotional content that the external device found by the search.

11. The information processing method according to claim 10, further comprising:
    during the display of the promotional content, storing in the memory a commodity ID of the commodity that has been scanned.

12. The information processing method according to claim 11, further comprising:
when promotional content having a previously determined degree of customer interest that is greater than or equal to the threshold value is not found by the search, displaying on the display a screen showing promotional content associated with a most recently stored content ID.

13. The information processing method according to claim 12, further comprising:
determining personal attributes of the customer from the captured image, and
selecting promotional content for display based on the determined personal attributes.

14. The information processing method according to claim 11, further comprising:
acquiring commodity information associated with the commodity ID; and
outputting to the external device the commodity information in association with the commodity ID.

15. The information processing method according to claim 14, wherein the commodity information is stored in the external device in association with the displayed promotional content, the customer ID, and the degree of customer interest.

16. The information processing method according to claim 10, wherein the analyzing comprises detecting facial expressions of the customer and measuring a gazing time of the customer gazing at the screen.

17. The information processing method according to claim 10, further comprising:
issuing a receipt using a printer.

18. The information processing method according to claim 10, further comprising:
when the determined degree of customer interest is greater than or equal to the threshold value, determining a category to which the displayed promotional content belongs and outputting the determined category in association with the displayed promotional content.

19. A point of sale (POS) system, comprising:
a customer management device that stores items of promotional content; and
a commodity registration device including:
a network interface,
a display for a customer to which an imaging device is attached,
a scanner by which a symbol attached to a commodity is scanned, and
a processor configured to:
acquire a customer ID for identifying a customer,
upon scanning of a symbol by the scanner, control the network interface to transmit a request to the customer management device for promotional content about a commodity to be shown for the customer, generate a screen for the display including the promotional content, control the imaging device to capture an image of the customer facing the display, and analyze the captured image of the customer's face, and
control the network interface to transmit the displayed item of to the customer management device the acquired customer ID and the determined degree of customer interest in association with displayed promotion content, wherein
the customer management device is further configured to search for promotional content having a previously determined degree of customer interest that is greater than or equal to a threshold value, and
the commodity registration device is further configured to generate a screen for display, showing the promotional content that the customer management device found by the search.

* * * * *

UNITED STATES PATENT AND TRADEMARK OFFICE
CERTIFICATE OF CORRECTION

PATENT NO. : 11,216,849 B2
APPLICATION NO. : 16/896128
DATED : January 4, 2022
INVENTOR(S) : Toshihiko Nannichi It is certified that error appears in the above-identified patent and that said Letters Patent is hereby corrected as shown below:

In the Claims

In Column 18, Claim 19, Line 24, please delete "the displayed item of".

Signed and Sealed this
First Day of November, 2022

Katherine Kelly Vidal
*Director of the United States Patent and Trademark Office*